UNITED STATES PATENT OFFICE.

WALTER KÖNIG, OF DRESDEN, GERMANY, ASSIGNOR TO FARBENFABRIKEN VORM. FRIEDR. BAYER & CO., OF ELBERFELD, GERMANY, A CORPORATION OF GERMANY.

RED DYE.

No. 913,514.      Specification of Letters Patent.      Patented Feb. 23, 1909.

Application filed November 30, 1908. Serial No. 465,103.

*To all whom it may concern:*

Be it known that I, WALTER KÖNIG, doctor of technical arts, chemist, citizen of the German Empire, residing at Dresden, Saxony, Germany, have invented new and useful Improvements in New Red Dyestuffs, of which the following is a specification.

My invention relates to the manufacture and production of new red to violet basic dyestuffs which apart from their great coloring power are remarkable for their very clear shades fast to washing and to light. They can be dyed on tanned cotton and are reddish products soluble in hot water with a red color.

The process for their production consists in treating phenmorpholins, especially phenmorpholin and its substitution products, with pyridins and cyanogen halogenids, which yield cyanpyridiniums as intermediate compounds. The same dyestuffs are obtained on starting from dinitrophenylpyridinium salts instead of cyanogenpyridiniums.

In order to illustrate the new process more fully the following example is given. A mixture is prepared from 8 kilograms of pyridin, 60 liters of methyl alcohol and 29.8 kilograms of methylphen-morpholin.

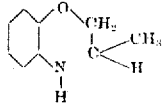

To this mixture 50 liters of a double normal solution of cyanogen bromid in ether or benzene (containing 212 grams of BrCN in one liter) are added in the course of half an hour. The mixture grows hot and soon becomes red and opaque. After having been stirred for about 1-2 hours at the ordinary temperature so much of dilute hydrochloric acid is added to the mass of the reaction that a thick pulpy mass results and the liquid that covers this mass is only slightly colored. The dyestuff is then filtered off with suction, washed with a small quantity of hydrochoric acid and dried at the ordinary temperature or *in vacuo* at 100° C.

It is thus obtained in the shape of microscopic, violet-brown needles having a blue luster which are easily soluble in alcohol, glacial acetic acid and in hot water with a red color. The new dyestuff dyes tanned cotton a beautiful yellowish-red shade.

The process described in the above example can be changed in different ways by using *e. g.* other diluents, such as glacial acetic acid, pyridin, benzene, ether etc. or by carrying out the reaction in an aqueous solution or emulsion; or an aqueous solution of cyanogen bromid or chlorid may be used; the production of which is described in *Berichte der Deutschen Chemischen Gesellschaft* 28, p. 2471 and 29, p. 1823.

Instead of pyridin its gamma and beta substitution products can be used *e. g.* beta-picolin, gamma-picolin, beta-oxypyridin, beta-chloropyridin etc. and other substitution products of phenmorpholin or phenmorpholin itself may be used.

Having now described my invention and in what manner the same is to be performed, what I claim as new and desire to secure by Letters Patent is:—

1. The herein-described new basic dyestuffs obtainable from cyanogen halogenids, pyridins and phenmorpholins, especially phenmorpholin and its substitution products, which dyes are reddish products soluble in hot water with a red color; and dyeing tanned cotton red shades, substantially as described.

2. The herein-described new basic dyestuff obtainable from cyanogen bromid, pyridin and methylphenmorpholin, which forms, after being dried, miscroscopic violet-brown needles which are easily soluble in alcohol, glacial acetic acid and hot water with a red color; and which dye tanned cotton yellowish-red shades, substantially as described.

In testimony whereof I have hereunto set my hand in the presence of two subscribing witnesses.

WALTER KÖNIG.

Witnesses:
RUDOLF SCHRECKENBACH,
RICHARD HOFMANN.

It is hereby certified that in Letters Patent No. 913,514, granted February 23, 1909, upon the application of Walter König, of Dresden, Germany, for an improvement in "Red Dyes," an error appears in the printed specification requiring correction, as follows: In the formula, line 33, between the letters "N" and "C," a diagonal line (/) should be inserted; and that the said Letters Patent should be read with this correction therein that the same may conform to the record of the case in the Patent Office.

Signed and sealed this 20th day of April, A. D., 1909.

[SEAL.]

C. C. BILLINGS,
*Acting Commissioner of Patents.*